US008935136B2

(12) United States Patent
Smith et al.

(10) Patent No.: US 8,935,136 B2
(45) Date of Patent: Jan. 13, 2015

(54) MULTI-COMPONENT MODEL ENGINEERING

(75) Inventors: Matthew James Smith, Cambridge (GB); Vassily Lyutsarev, Cambridge (GB); Drew William Purves, Cambridge (GB); Mark Christopher Vanderwel, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 244 days.

(21) Appl. No.: 13/240,999

(22) Filed: Sep. 22, 2011

(65) Prior Publication Data

US 2013/0080129 A1    Mar. 28, 2013

(51) Int. Cl.
G06G 7/48 (2006.01)
G06N 99/00 (2010.01)

(52) U.S. Cl.
CPC ................................ *G06N 99/005* (2013.01)
USPC ............................................................ 703/6

(58) Field of Classification Search
CPC ..... G06N 99/005; G06N 7/005; G06N 5/022; G06F 17/5009; G06F 17/271; G06F 2217/10
USPC ......................................................... 703/6, 2
See application file for complete search history.

(56) References Cited

U.S. PATENT DOCUMENTS

| | | | |
|---|---|---|---|
| 5,872,957 A * | 2/1999 | Worthington et al. | 703/13 |
| 5,881,270 A * | 3/1999 | Worthington et al. | 703/21 |
| 7,191,163 B2 * | 3/2007 | Herrera et al. | 706/47 |
| 2010/0057415 A1 | 3/2010 | Chu et al. | |
| 2010/0332423 A1 * | 12/2010 | Kapoor et al. | 706/12 |
| 2011/0191549 A1 | 8/2011 | Lyutsarev et al. | |
| 2012/0023042 A1 * | 1/2012 | Das | 706/12 |
| 2012/0323558 A1 * | 12/2012 | Nolan et al. | 704/9 |
| 2013/0024411 A1 * | 1/2013 | Cai et al. | 706/46 |
| 2013/0128060 A1 * | 5/2013 | Rhoads et al. | 348/207.1 |

OTHER PUBLICATIONS

Bonan et al. (A dynamic global vegetation model for use with climate models: concepts and description of simulated vegetation dynamics, Blackwell Publishing Ltd, 2003, pp. 1543-1565).*
Drake et al. (Overview of the software Design of the community climate system model, Sage Publications, 2005, pp. 177-186).*
Sato et al. (SEIB-DGVM: A new Dynamic Global Vegetation Model using a spatially explicit individual-based approach, Elsevier B.V., 2006, pp. 279-307).*

(Continued)

*Primary Examiner* — Omar Fernandez Rivas
*Assistant Examiner* — Iftekhar Khan
(74) *Attorney, Agent, or Firm* — Sula Miia; Micky Minhas; Zete Law, P.L.L.C.

(57) ABSTRACT

Multi-component model engineering is described, for example, to model multi-component dynamical systems in which the true underlying processes are incompletely understood such as the Earth's biosphere, whole organisms, biological cells, the immune system, and anthropogenic systems such as agricultural systems, and economic systems. In an embodiment individual component models are linked together and associated with empirical data observed from the system being modeled in a consistent, repeatable manner. For example, a model component, its links with data, its outputs, and its links with other model components, are specified in a format to be passed directly to inference routines which use an inference engine to infer the most likely parameters of the multi-component model given subsets of the empirical data. The inferred parameter values take the form of a probability distribution representing the degree of uncertainty in most likely parameter. An embodiment describes ways of identifying model components for revising.

20 Claims, 8 Drawing Sheets

(56) References Cited

OTHER PUBLICATIONS

Nicky Best et al, "Modelling complexity in health and social sciences: Bayesian graphical models as a tool for combining multiple sources of information", Proceedings of the 3rd ASC International Conference on Survey Records, Mar. 29, 2009, http://eprints.ncrm.ac.uk/741/1/Best_ICSRM_2005.doc.

Bryan S. Ware, et al, "A risk based decision support system for antiterrorism", Aug. 14, 2002, http://www.dsbox.com/Documents/MSS_A_Risk-Based_Decision_Support_System_for_Antiterrorism.pdf.

Dmitri Soshnikov, "An Approach for Creating Distributed Intelligent Systems", Workshop on Computer Science and Information Technologies, 1999 http://citeseerx.ist.psu.edu/viewdoc/download-?doi=10.1.1.27.1776&rep=rep1&type=pdf.

Andrew D. Marti, et al, "MCMCpack: Markov chain Monte Carlo in R", Journal of Statistical Software, Jun. 2011, http://www.law.berkeley.edu/files/jstatsoftMCMCpack.pdf.

Jaliya Ekanayake, et al, "A Collaborative Framework for Scientific Data Analysis and Visualization", Collaborative Technologies and Systems, pp. 339-346, May 2008 http://ieeexplore.ieee.org/stamp/stamp.jsp?tp=&arnumber=4543948.

Purves, et al, "Predicting and understanding forest dynamics using a simple tractable model", PNAS vol. 105 No. 44 17018-17022 and SI appendix 1 and 2, Nov. 4, 2008, www.pnas.org/cgi/doi/10.1073/pnas.0807754105.

Siddhartha Chib, et al, "Understanding the Metropolis-Hastings Algorithm", The American Statistician, vol. 49, No. 4, pp. 327-335, Nov. 1995.

Matthew Smith, Presentation given at British Ecological Society Annual General Meeting, Sep. 14, 2011.

* cited by examiner

MULTI-COMPONENT MODEL ENGINEERING

BACKGROUND

Multi-component models are often used to model dynamical systems that can be conveniently represented as a system of interacting components. Examples include models of the Earth's biosphere, whole organisms, biological cells, the immune system, and anthropogenic systems such as agricultural systems, automobiles and economic systems. A dynamical system in this context is one whose state can change through time as a result of the behavior of mechanisms internal to the system, although this could be in response to changes in factors external to the system. In multi-component models, individual aspects of the modeled system are each represented using a dedicated model component. The model components are then interconnected to form a whole multi-component model. Designing the model components and the way these are to be interconnected can be a complex task, particularly when the systems being modeled are not fully understood. For example, this is often the case for natural systems in which scientists only partially understand their functioning.

Empirical data is typically used to parameterize and evaluate multi-component models, especially when the underlying mechanisms of the system being modeled are not fully understood. This can be a challenging process because relevant data may come from multiple sources, in various formats, in variable quantities, and with different access permissions.

The embodiments described below are not limited to implementations which solve any or all of the disadvantages of known multi-component model-engineering systems.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Multi-component model engineering is described, for example, to model multi-component dynamical systems in which the true underlying processes are incompletely understood such as the Earth's biosphere, whole organisms, biological cells, the immune system, and anthropogenic systems such as agricultural systems, and economic systems. In one embodiment individual component models are linked together and associated with empirical data observed from the system being modeled in a consistent, repeatable manner. For example, a model component linking and data association process outputs results in a specified format direct to inference routines which use an inference engine to infer the most likely parameters of the multi-component model given subsets of the empirical data. In various embodiments the inferred parameter values take the form of a probability distribution representing the degree of uncertainty in most likely parameter. In an embodiment ways of identifying whether any of the model components need revising are described.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a multi-component dynamic global vegetation model (DGVM), the system described is provided as an example and not a limitation. As those skilled in the art will appreciate, the present examples are suitable for application in a variety of different types of multi-component models of dynamical systems.

Figure 1:
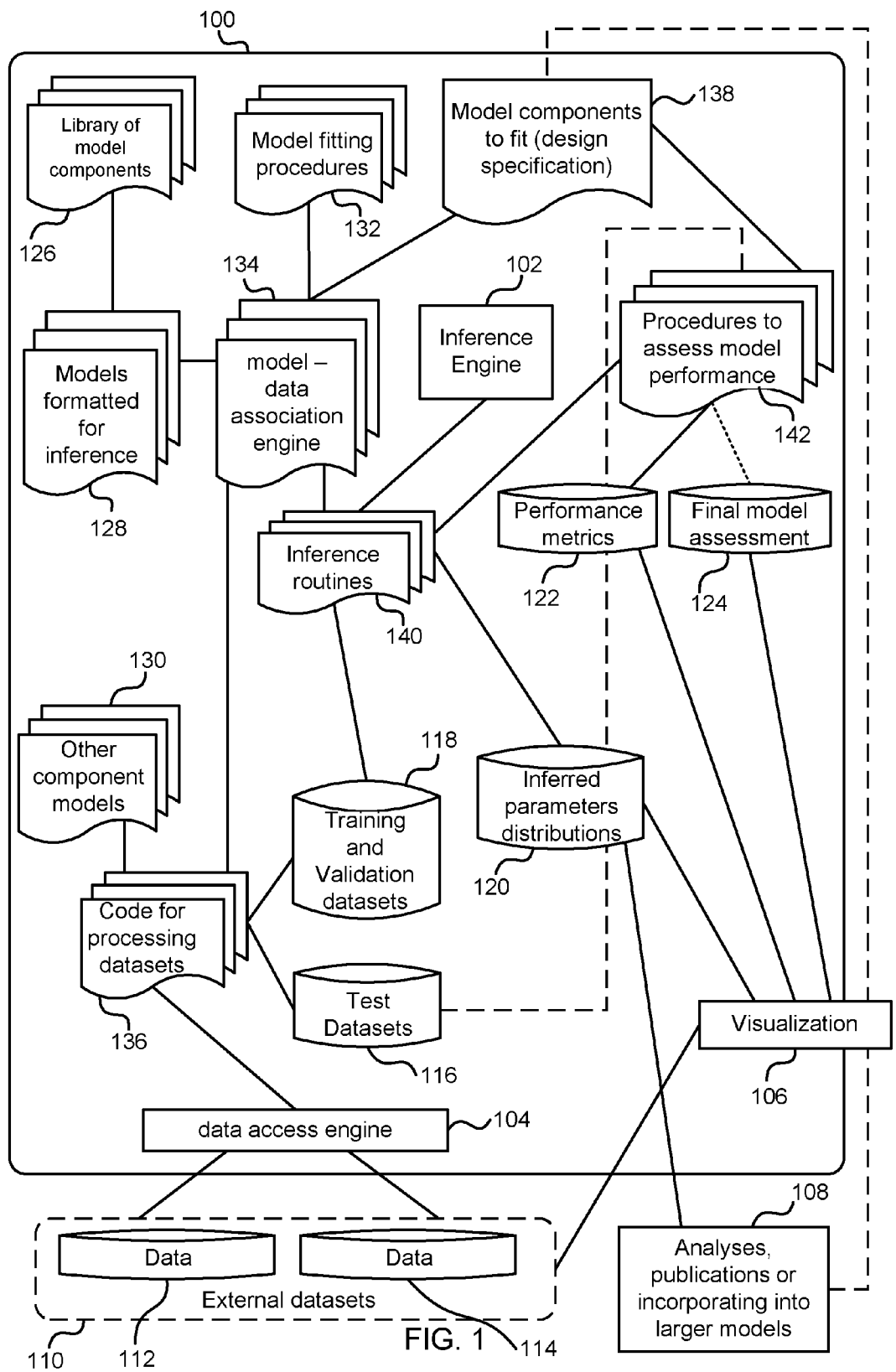
FIG. 1 is a schematic diagram of an engineering system for multi-component models.

FIG. 1 is a schematic diagram of an engineering system 100 for multi-component models. The multi-component models may be predictive in that they may be used to predict behavior of the dynamical system being modeled. A non-exhaustive list of examples of dynamical systems that may be modeled is: the Earth's biosphere, whole organisms, biological cells, the immune system, and anthropogenic systems such as agricultural systems and economic systems. The engineering system 100 is particularly useful for modeling dynamical systems where we do not understand actually how the different components function (in contrast to say an airplane which has been designed, and which obeys known mechanical laws). Dynamical systems may be modeled using a plurality of interconnected component models. Each component model may be a representation of how an individual part of the larger complex dynamic system behaves. Each component model comprises one or more functions representing biological or physical processes and their interactions. Each function has one or more parameters specified by the creators of the model, such as scientists. Each component model may have arbitrary complexity.

In the embodiments described herein the model components are probabilistic; that is probability distributions may be assigned to the parameters of the model components representing the degree of certainty or uncertainty in the knowledge of that parameter's value. These probability distributions are initially set to default values, often incorporating prior knowledge about the parameters most likely values, and an inference engine repeatedly updates the probability distributions by comparing the predictions of a parameterized model with training data. For example, the mean of a probability distribution may represent the most probable value for a parameter and may be updated as more is learnt from training data about the value of the particular parameter. For example, the variance of a probability distribution may represent the degree of uncertainty about a parameter value. For example, the variance may be reduced representing increased certainty in the knowledge of the parameter value as more is learnt from the training data.

The engineering system 100 may be used to establish which model components are to be used, how these are interconnected, and which data sets are to be used to train, validate and test the model and/or model components. The engineering system 100 may also be used to establish how performance of the resulting model is to be assessed, for example, by formally comparing model predictions with data in specific ways. The engineering system optionally includes a facility to visualize model performance assessment results, predictions and/or simulations generated by the model and uncertainty of parameters of the various component models. The engineering system 100 provides a framework to enable scientists to develop and refine models of complex dynamical systems in an efficient, repeatable and consistent manner. Using the system scientists are able to define multi-component models, to couple the component models with datasets, to assess the component models and the whole multi-component model and to assess where most of the uncertainty or inconsistency lies within the multi-component model.

In the example of FIG. 1 a plurality of libraries of model components 126, 130 are shown. These may be in the form of source code, software binaries or other software specifying functions representing biological, physical or other dynamical processes. Different versions of the model components may be selected by an operator to form a multi-component predictive model. In this way the engineering system enables scientists to define multi-component models in a simple, repeatable and rigorous manner. In the case that the engineering system is used to form a dynamic global vegetation model (DGVM) the libraries of model components 126, 130 may comprise a library of vegetation component models and a library of other component models such as soil hydrology models.

One or more software binaries 128, source code or other forms of software is provided for formatting the model components for inference. For example, this comprises selecting which parameters are to be inferred and initializing those parameters by establishing a data structure in memory to hold information about probability distributions associated with the parameters and setting those to default initial values such as zero or 1. In an example the software for formatting the model components for inference comprises inference engine elements comprising software provided in a file or other structure, as a class of an object oriented programming language, or other formats. These elements are described in more detail below with reference to FIG. 4 in the case that the elements are classes of an object oriented programming language.

Data to be used to train the model components and to assess the trained model is obtained from data sets 110 accessible to the model engineering and refinement system. In the example shown in FIG. 1 two external data sets 112, 114 are shown. One or more data sets may be used and these may be internal or external to the system. In some cases one or more of the data sets are available via remote web services. The data may be in different formats and comprise values of different types according to the particular research domain.

A data access engine 104 may comprise a plurality of object-oriented software classes which may be used to enable data to be passed from the data sets 112, 114 (which are in various formats) into other software in the engineering system in a manner independent of the original format of the data in the datasets. An example of software for use in the data access engine 104 is given in U.S. patent application Ser. No. 12/698,654 "Data array manipulation" filed on 2 Feb. 2010. The data access engine 104 may also comprise one or more libraries of software which provide an application programming interface to a remote web service which provides data.

Software code 136 for processing the datasets may be included in the model engineering system, for example, to partition the data into one or more test portions and one or more training and validation portions. A plurality of training and validation portions (sometimes referred to as folds of data) may be formed from the datasets in the case that cross-validation is to be used during a model assessment process. Cross-validation may involve training a model using $9/10$ths of a portion of data and then validating the trained model using the remaining $1/10^{th}$ of the portion of data (other fractions of the data may be used, $9/10$ and $1/10$ is only one example). This process may then be repeated for different folds of the data; that is training the model using a different $9/10$ths of the data and so on. The software code 136 for processing the datasets outputs data (or addresses of locations of the data) into a training and validation dataset store 118 and also to a test dataset 116.

The software code 136 for processing the datasets may also be arranged to divide the data into portions in the case that a plurality of computers is used to carry out the parameter inference process. Different portions of data may be processed at different computers in order to enable large amounts of data to be processed in practical time scales. This is described in more detail later with reference to FIGS. 6 and 7.

The software code 136 for processing the datasets may have access to one or more data terms and conditions files for each dataset. These files are stored at a memory accessible to the model engineering system and enable a user to check that any terms and conditions for use of a particular dataset are complied with.

A model-data association engine 134 comprises software which associates or combines specified model components (which are in a format for use by an inference engine) with specified datasets. The result is passed to inference routines 140 which utilize an inference engine 102 to obtain estimates of the parameter probability distributions. More detail about the model-data association engine is given below with reference to FIG. 3.

The inference engine 102 is arranged to perform parameter estimation (for example Bayesian parameter inference, or Maximum Likelihood parameter estimation when prior probability distributions are not specified). For example, the inference engine may use a Markov Chain Monte-Carlo method which estimates model parameters given data, a specified model, and prior parameter distributions. In other examples the inference engine may use Bayesian inference with graphical models although this is more suitable where the component models do not have arbitrary complexity. An example of an inference engine using a Markov Chain Monte-Carlo method which may be used is now described in more detail.

In this example the inference engine uses a form of the Metropolis-Hastings MCMC algorithm to sample from the joint posterior distribution of the parameters of a given model component. The Metropolis-Hastings MCMC algorithm is described in detail in "Chib S, Greenberg E (1995) Understanding the Metropolis-Hastings algorithm." Am Stat 49:327-335. The algorithm enables the joint posterior distribution of the parameters to be estimated. The inference engine in this example calculates the probability of the empirical data given prior parameter distributions and the predictions of the parameterized model. This process repeats for each set of training data. It then uses update rules based on Baye's law to update prior distributions of the parameters and to obtain a joint posterior distribution. That joint posterior distribution is sampled using the MCMC algorithm and used as an updated prior distribution for the parameters.

In an example, a form of the Metropolis-Hastings MCMC algorithm is used, which conforms to the requirements for the Metropolis-Hastings MCMC algorithm to converge to the correct posterior distribution, is robust to the problem of local (non-global) maxima and converges quickly. In this algorithm, at each MCMC step, random changes are proposed to randomly selected parameters, where the number of parameters to be changed varies from one to the total number of parameters. Proposal distributions for each parameter are tuned during an initial 'burn-in' period (for example, 10,000 MCMC steps) to achieve an approximate Metropolis-Hastings acceptance rate of 0.25. This tuning is accomplished by iteratively adjusting the standard deviations of the normal random variables that define the proposal distributions. The standard deviations are fixed at the end of the burn-in period. Different proposal distributions may be used for parameters bounded between 0 and infinity, and parameters bounded between minus infinity and infinity, and the inference engine may omit explicitly including any prior information in the metropolis criterion. In this way non-informative priors may be used with different forms for the proposal distributions on each parameter (uniform over logarithm of values, uniform over untransformed values, respectively). Following the burn-in period, the Metropolis-Hastings MCMC algorithm is continued for a specified number of steps (e.g. 100,000 further steps) and a posterior sample is recorded at regular intervals (e.g. every $100^{th}$ MCMC step). These samples may be saved for error propagation in the calculation of analytical metrics, and in model simulations.

The inference routines 140 comprise for example routines for implementing the inference engine using different subsets of the collection of training data or subsets of model components; and in summarizing the outputs from the inference engine for subsequent processing.

A library of model fitting procedures 132 comprises a plurality of pre-inference processes, model fitting procedures and simulation procedures (where the fitted model is used to make predictions). A user is able to configure factors about the datasets and/or about the model components. A user is able to specify, for each model component, which formats of data are required. Also, a user may select, for a specified model component, which model parameters are to be inferred. Assigning a fixed value to a model parameter, rather than inferring the parameter's value from data, can help a user to alleviate or mitigate overfitting. Overfitting occurs when the number of inferred model parameters is sufficiently high that during training the model is formed to so closely match the training data that it is unable to generalize and make good predictions when data is input to the model that has not previously been seen by that trained model. A user is also able to configure parameters which specify how the data is to be divided into training, validation and test portions and, if a cluster of computers is to be used for inference, how to allocate data between members of the cluster. In addition, a user is able to specify the model fitting procedures to be used. For example, the full multi-component model may be fitted or run to generate simulations, individual specified model components may be fitted or run to generate simulations, one or more model components may be replaced by an alternative model component or a constant, or specified datasets may be sequentially omitted. Any combination of model fitting procedures may be specified.

A specification of model components to fit (design specification) 138 provides input to the model-data association engine and to procedures for assessing model performance 142. The specification 138 provides a list of unique names identifying the precise model components from the models formatted for inference 128 for use in the model-data association engine, and for post-inference model assessment 142.

The procedures for assessing model performance 142 comprises a software library of routines which provide functionality such as a range of model performance assessment metrics or other assessment processes whereby a trained model component is assessed using training validation or test data, comparison processes whereby performance of a trained model component is compared with performance of an alternative formulation for that component, or compared using other standards. The output of the procedures for assessing model performance 142 may comprise performance metrics which are stored at a data store 122 at any suitable location. In some examples the performance metrics are obtained during a cross-validation process using training and validation datasets 118. A final model assessment 124 may then be made using a test dataset 116 and the results stored at final model assessment store 124.

A visualization engine 106 may be used to display the performance metrics 122, final model assessment 124 and inferred parameter probability distributions 120. The visualization engine also enables users to inspect and visualize graphically the data from the datasets which may be diverse.

The inferred parameter distributions 120 are optionally used for analysis, publications or incorporating into larger models 108.

Figure 2:
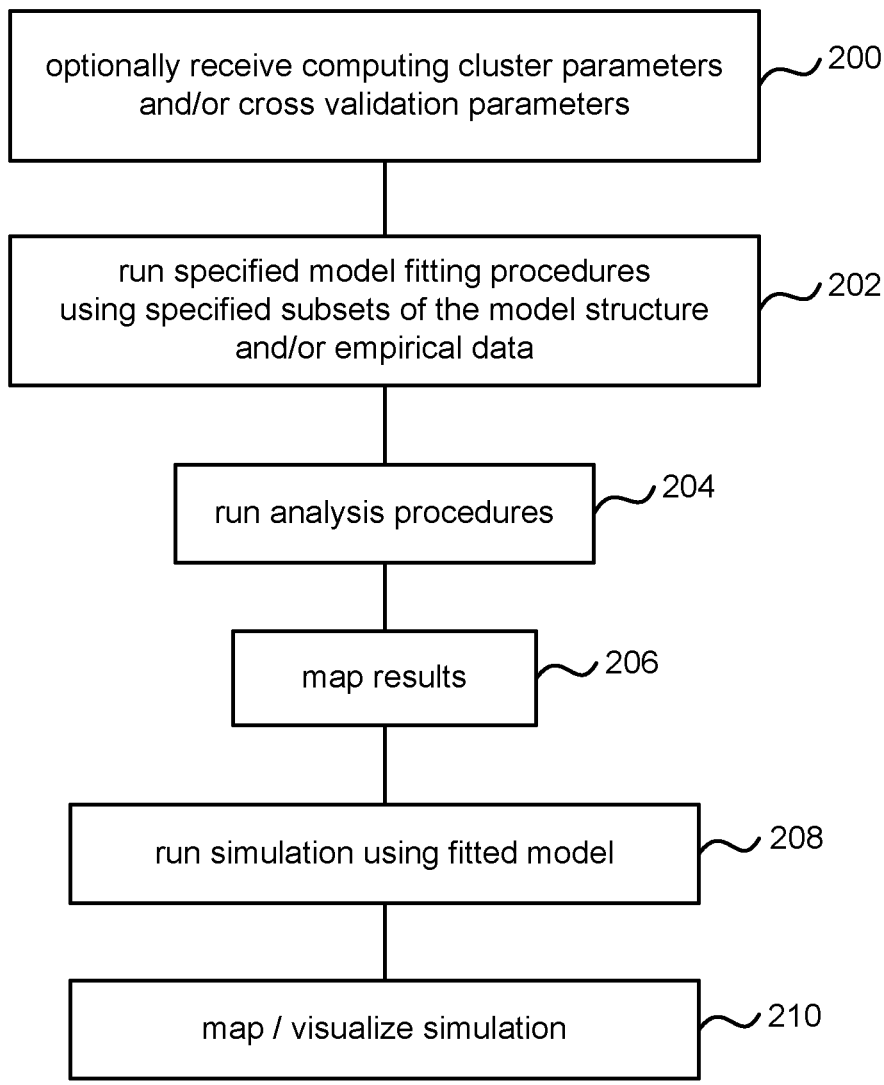
FIG. 2 is a flow diagram of a method of operation at the engineering system of FIG. 1.

FIG. 2 is a flow diagram of a method of operation at a model engineering system. Computing cluster parameters are optionally received 200. Cross-validation parameters are also optionally received or other parameters specifying how the data is to be divided into training, validation and test portions. These parameters may be received from user input or may be pre-configured.

A user may have specified which model fitting procedures are to be used or these may be pre-configured. The method runs 202 the specified model fitting procedures using specified subsets of the model structure and datasets. A subset of the model structure may be one or more of the model components. Analysis procedures are run 204 to assess the performance of the fitted model. The analysis procedures are specified by user input or may be pre-configured. Any georeferenced results of the analysis procedures may be mapped 206 or otherwise visualized using the visualization engine. A simulation may be run 208 using the fitted model and the results of the simulation may be mapped (in the case of georeferenced results) or visualized 210 using the visualization engine.

Figure 3:
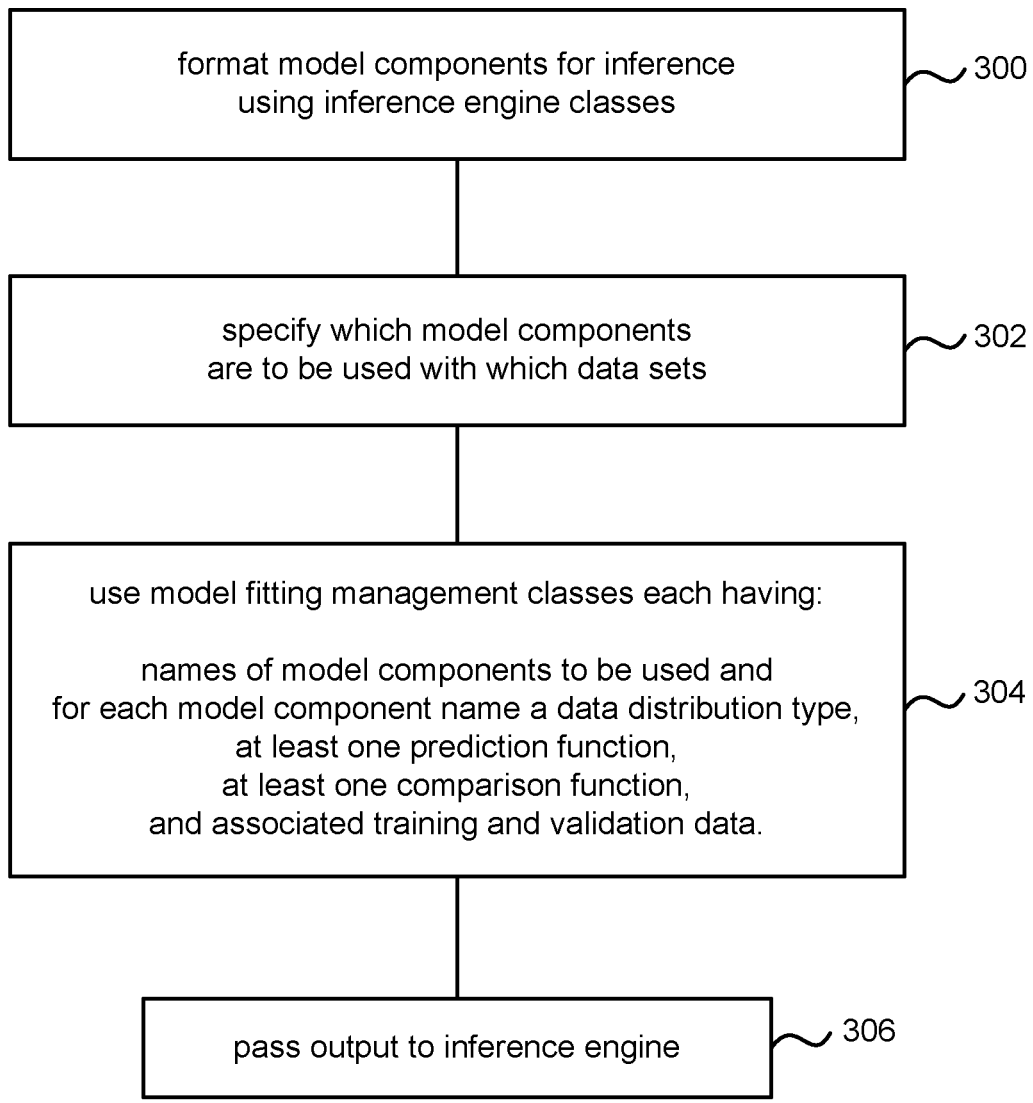
FIG. 3 is a flow diagram of a method of specifying model components and data sets for use in the engineering system of FIG. 1.

FIG. 3 is a flow diagram of a method of specifying model components and data sets for use in the engineering system. The model components are formatted for inference using inference engine elements (which may be provided as classes of an object oriented programming language or in other formats). This is described in more detail with reference to FIG. 4. The relevant inference engine classes are passed to the model data association engine. A user is able to specify 302 which model components are to be used with which datasets using the model data association engine as mentioned above. The model data association engine uses 304 model fitting management elements which are available in a library of inference routines 140. Each model fitting management element (which in some examples is a class) has one or more names of model components to be used and for each model component name a data distribution type, at least one prediction function, at least one comparison function, and associated empirical data. The associated empirical data may be provided indirectly in the case where two or more model components are linked, at least one of the model components has associated empirical data and other model components use data associated with the other model components. The data distribution type may be for example, normal, Gaussian, bimodal, multimodal, or any other indicator of the form of the distribution of the data in the dataset to be used. The at least one prediction function is that function to be used by the inference engine during model fitting and/or when the model component is used for simulation. The at least one comparison function is to be used by the engineering system when assessing model performance. In this way the model fitting management elements provide an application programming interface which enables users of the engineering system to associate model components with datasets and to couple model components. For example, where a model fitting management element has a plurality of names of model components, those model components and associated empirical data are coupled to form a multi-component model.

The output of the model-data association engine comprises one or more model fitting management elements. These are passed 306 to the inference engine to perform parameter estimation.

Figure 4:
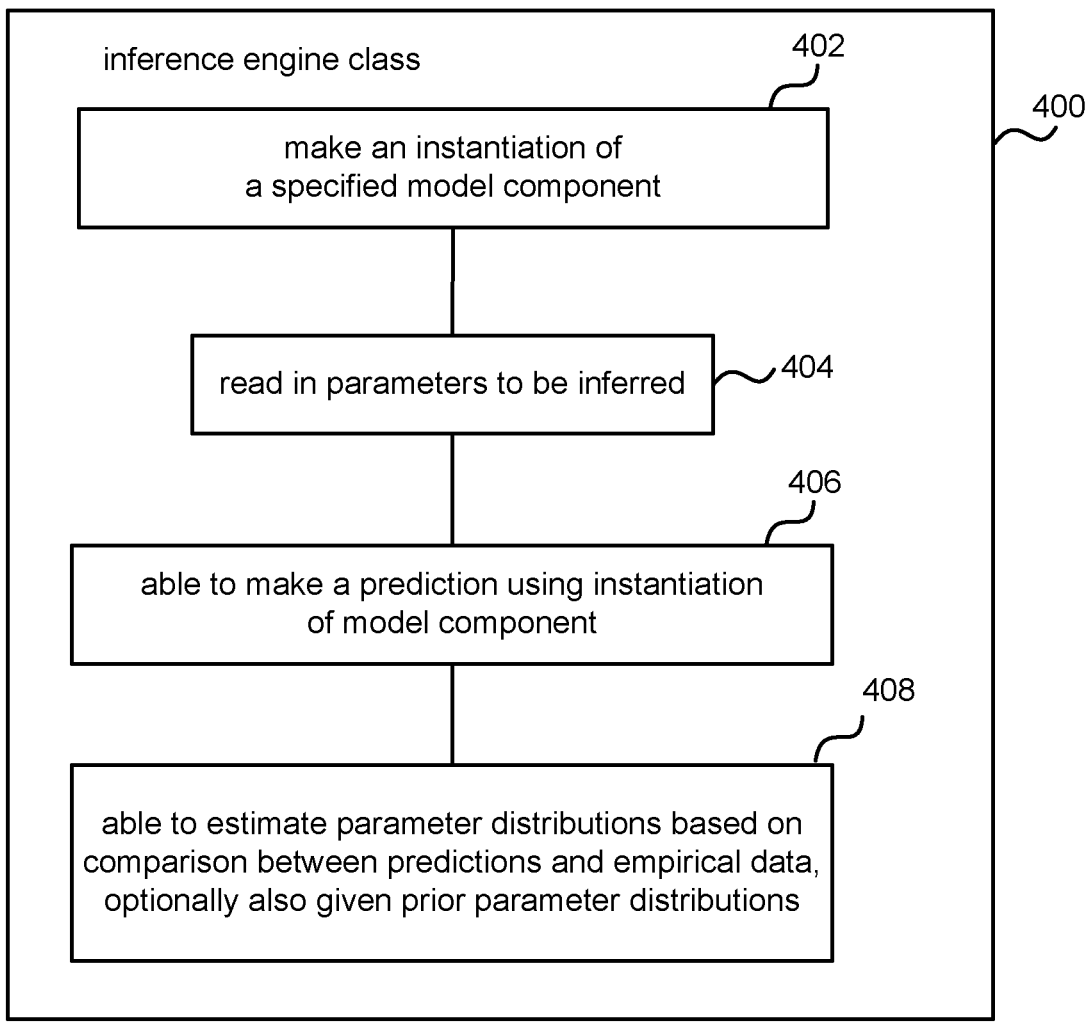
FIG. 4 is a schematic diagram of an inference engine class.

With reference to FIG. 4 each inference engine element (which is a class in some examples) 400 is arranged to make 402 an instantiation of a specified model component. The inference engine class is able to read in parameters 404 to be inferred. For example, these parameters may have been specified by a user or may be pre-configured. The inference engine class is able to make 406 a prediction using the instantiation of the model component. The inference engine class uses a method to estimate the parameter probability distributions based on comparison between predictions and empirical data, possibly given prior parameter distributions. In the example above the method used is MCMC sampling using the Metropolis-Hastings algorithm.

Figure 5:
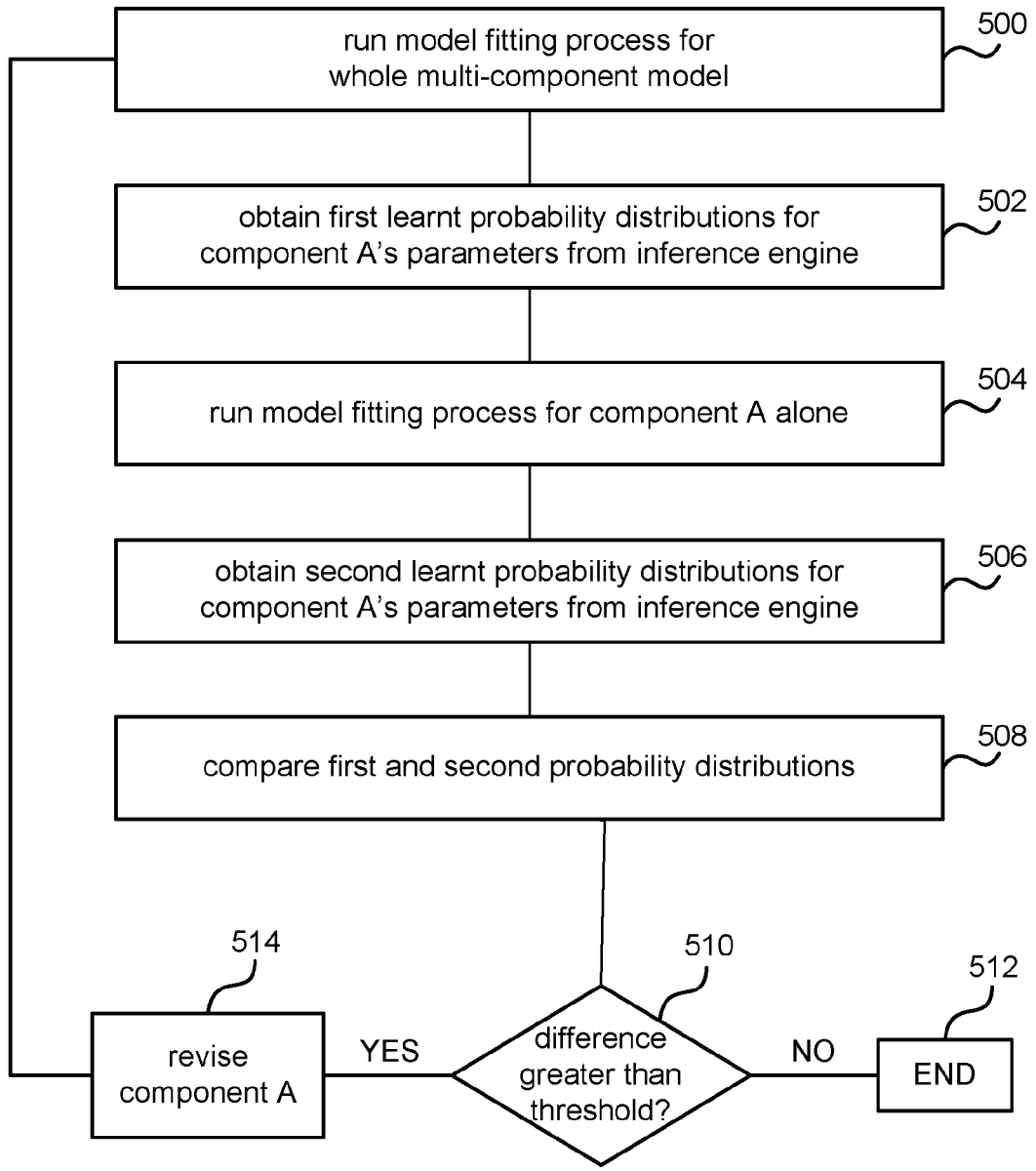
FIG. 5 is a flow diagram of a method of refining a multi-component model.

Using the model engineering system 100 it is possible to identify one or more model components which are most in need of revising. This is now described with reference to FIG. 5. A model fitting process is run 500 for the whole multi-component model which has two or more model components and uses two or more datasets. One of the model components is referred to as component A for clarity of description in this example. First learnt probability distributions are obtained 502 as a result of the model fitting process for each of the model components and those for model component A's parameters are stored. The model fitting process 504 is then carried out again, this time for model component A alone (rather than for the whole multi-component model). Second learnt probability distributions are obtained 506 for model component A's parameters from the inference engine. The first and second probability distributions are then compared 508 and if the difference is greater than a threshold 510 then component A is identified as needing revision. Model component A may be revised 514 by scientists or in an automated manner and the method repeated until the first and second probability distributions are similar and the method ends 512. The process may be repeated for each of the model components in the multi-component model.

The probability distributions provide an indication of the amount of uncertainty the fitted model has in the parameters of model component A. By using the method of FIG. 5 it is possible to differentiate between effects the whole multi-component model has on the parameters of component A to those inferred when using model A alone.

Figure 6:
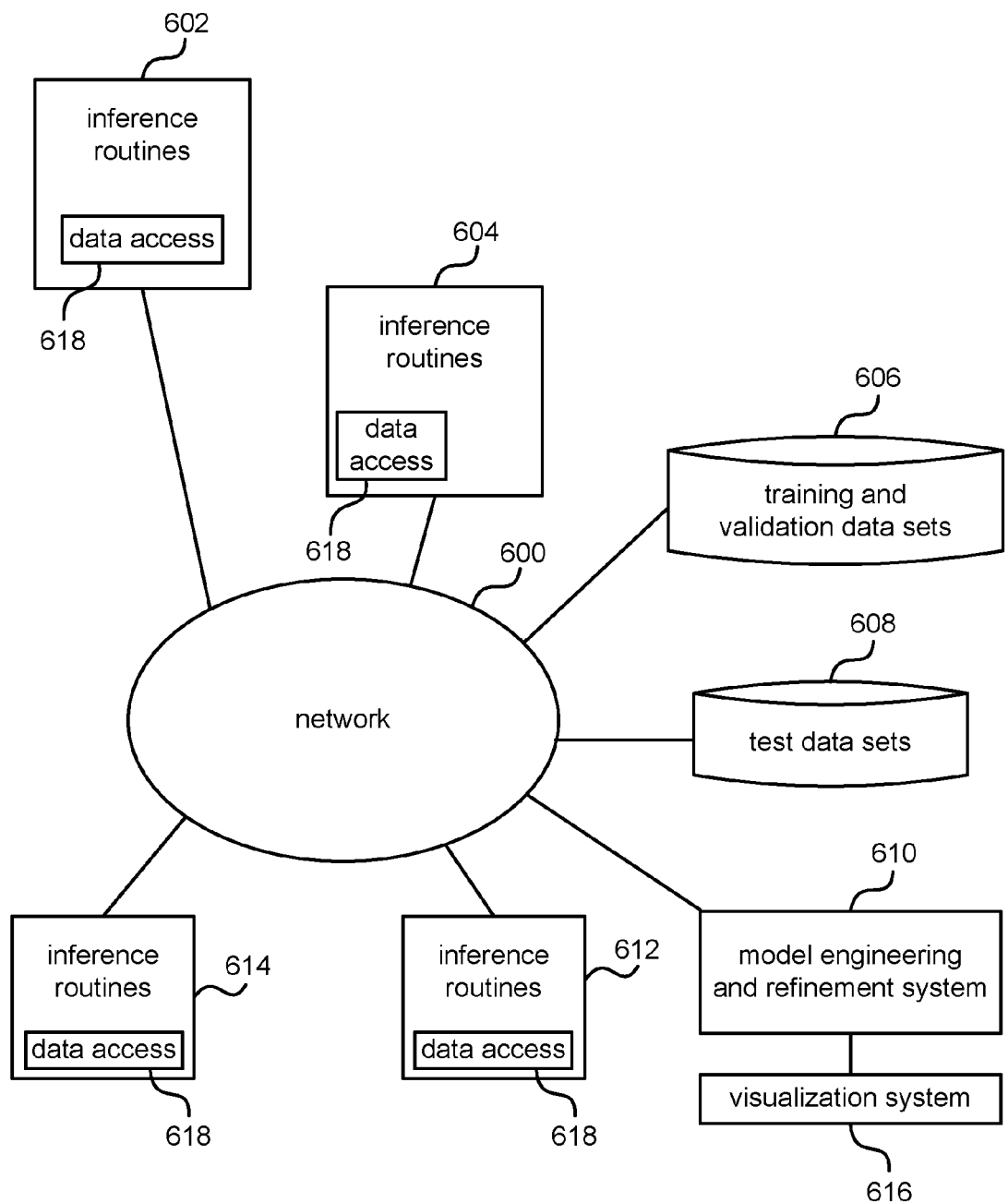
FIG. 6 is a schematic diagram of a cluster of computing devices for use with an engineering system for multi-component models.

Multiple "model fitting experiments" can be conducted in a similar way to FIG. 6 but fitting subsets of the full model to subsets of the data. This can be specified by implementing different inference routines, 140. This can be used to identify the empirical datasets and/or model components that lead to the most variation in the inferred parameters or in the predictive performance of the model.

Another option is to use the probability distributions obtained at the end of step 500 when the whole model has been fitted. These probability distributions can be used to identify the model components with the most uncertainty. However, this approach does not take into account the influence of the way the model components are connected together in the particular multi-component model.

FIG. 6 is a schematic diagram of a cluster of computing entities 602, 604, 612, 614 which are connected via a communications network 600. A model engineering system 610 is also connected to the communications network 600 and so are one or more datasets comprising at least one training and validation dataset 606 and at least one test data set 608. The communications network is of any type able to enable data for the model fitting process to be transferred from the datasets to the computing entities and for results of the inference routines to be sent from the computing entities to the model engineering system 610.

Each computing entity comprises inference routines which are one or more of the inference routines 140 of the model engineering system 610. Each computing entity also comprises data access 618 functionality which enables the computing entity to access data from the training and validation datasets 606 and the test datasets 608. The model engineering system 610 is optionally in communication with a visualization system 616 which may be a visualization system as in FIG. 1.

Figure 7:
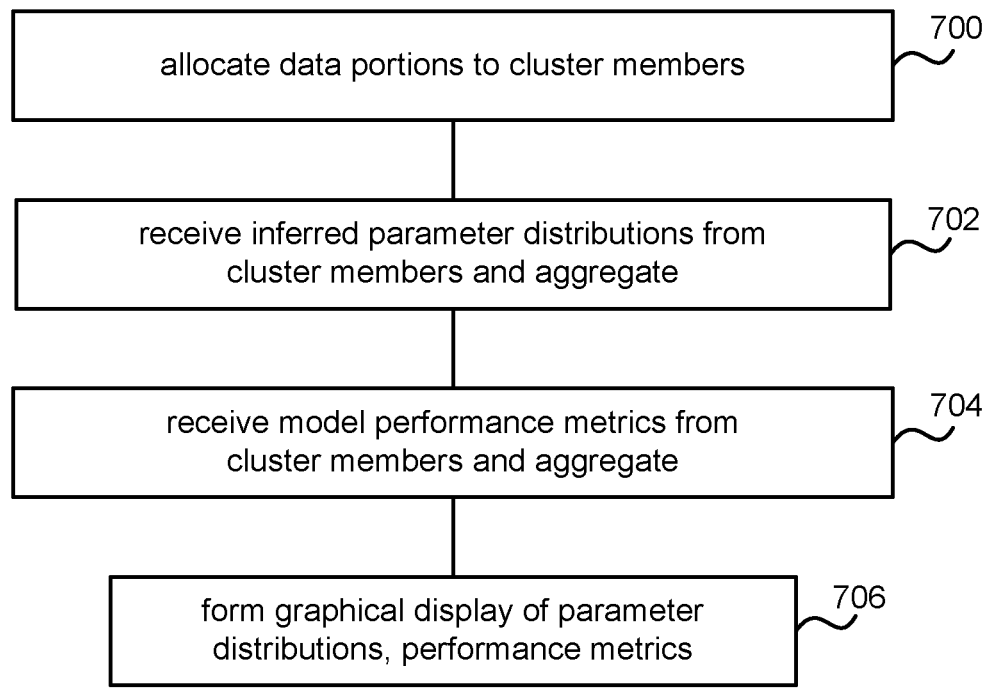
FIG. 7 is a flow diagram of a method of using the cluster of FIG. 6.

With reference to FIG. 7 the model engineering system is arranged to allocate data portions to the cluster members 700. For example, specified data ranges or portions of the training and validation datasets 606 and the test data sets 608 are allocated to different ones of the computing entities. Each computing entity uses one or more of its inference routines as specified by the model engineering system to process the data it receives. Each computing entity produces inferred parameter distributions and sends those to the engineering system. Each computing entity may also produce model performance metrics in the case that the computing entities also perform model assessment procedures.

The engineering system receives the inferred parameter distributions from the cluster members and aggregates 702 that information. It may also receive 704 model performance metrics from the cluster members and aggregate that information. A graphical display 706 of the parameter distributions and/or performance metrics may then be displayed using the visualization system.

Figure 8:
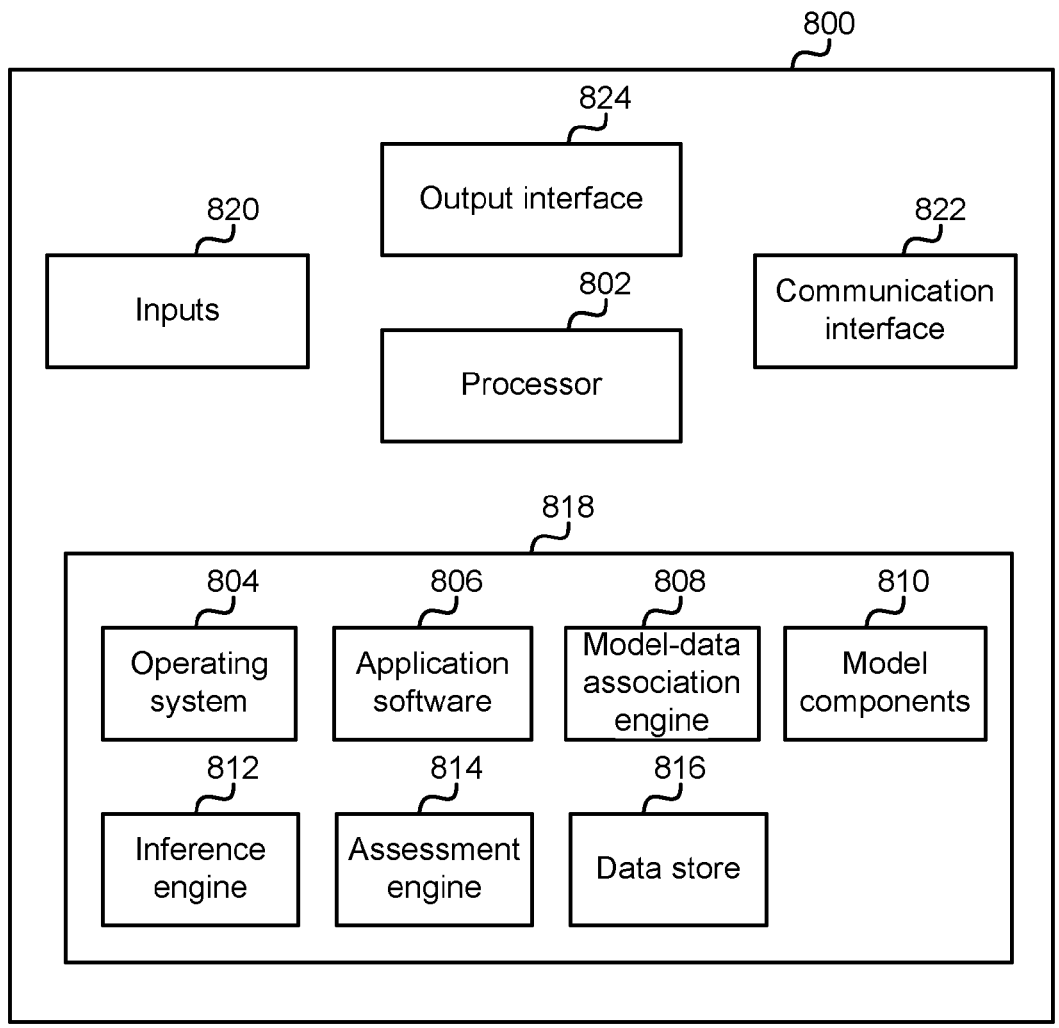
FIG. 8 illustrates an exemplary computing-based device in which embodiments of a multi-component model engineering system may be implemented.

FIG. 8 illustrates various components of an exemplary computing-based device 800 which may be implemented as any form of a computing and/or electronic device, and in which embodiments of a multi-component model engineering system may be implemented.

The computing-based device 800 comprises one or more inputs 820 which are of any suitable type for receiving media content, Internet Protocol (IP) input, natural system data, or other data. The device also comprises communication interface 822. For example, communication interface 822 may enable the computing-based device 800 to communicate with other computing entities over a communications network. In an example, the communications interface 822 enables natural system data to be transferred as well as probability distributions of model parameters.

Computing-based device 800 also comprises one or more processors 802 which may be microprocessors, controllers or any other suitable type of processors for processing computer executable instructions to control the operation of the device in order to carry out multi-component model engineering. In some examples, for example where a system on a chip architecture is used, the processors 802 may include one or more fixed function blocks (also referred to as accelerators) which implement a part of the methods described herein in hardware (rather than software or firmware).

The computer executable instructions may be provided using any computer-readable media that is accessible by computing based device 800. Computer-readable media may include, for example, computer storage media such as memory 818 and communications media. Computer storage media, such as memory 818, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 818) is shown within the computing-based device 800 it will be appreciated that the storage may be distributed or located remotely and accessed via a network or other communication link (e.g. using communication interface 822).

The computer executable instructions may comprise platform software comprising an operating system 804 to enable application software 806 to be executed on the device. The computer executable instructions may also comprise a model-data association engine 808, one or more model components 810, an inference engine 812, an assessment engine 814. Memory 818 may hold a data store 816 suitable for storing empirical data for use by the model engineering system.

An output interface 824 is also provided such as an audio and/or video output to a display system integral with or in communication with the computing-based device. The display system may provide a graphical user interface, or other user interface of any suitable type although this is not essential. The output interface 824 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A multi-component model engineering system comprising:
    one or more processors arranged to provide a library of model components each comprising a function for describing the behavior of a sub-set of the state variables of a multi-component dynamical system, and having at least one parameter, the multicomponent dynamical system including a multi-component model wherein each component of the multi-component model is a model comprising one or more functions representing biological or physical processes and their interactions;
    a data access engine arranged to access empirical data measured from the dynamical system, the data being accessed from a plurality of different datasets;
    an inference engine arranged to learn one or more of the parameters of specified ones of the model components and to learn a probability distribution for each parameter which represents a degree of uncertainty of the parameter;
    a model-data association engine arranged to link a plurality of specified model components from the library of model components to form a multi-component model and to associate each model component with parameters to be learnt, with data from at least one of the datasets;
    the model-data association engine also being arranged to pass the specified model components to the inference engine in a format suitable for use by the inference engine to learn the parameters and probability distributions of the specified model components using the data associated with the specified model components; and
    a model engineering system arranged to obtain a first learnt probability distribution based on a model fitting process for each of the model component of the entire multi-component model and a second learnt probability distribution based on a model fitting process of an individual model component, and automatically revise the individual model component to produce a revised model component if the difference between the first and second learnt probability distributions exceeds a threshold value, the revised model component retaining one or more elements of the individual model component.

2. A system as claimed in claim 1 wherein the model-data association engine is arranged to receive an inference engine element for each specified model component, the element being arranged to make an instantiation of the model component, read in parameters to be inferred and to make a prediction using the instantiation of the model component.

3. A system as claimed in claim 1 wherein the model-data association engine is arranged to form a model-fitting management element which links the plurality of specified model components to form the multi-component model.

4. A system as claimed in claim 3 wherein the model-fitting management element comprises, for each specified model component, a name, a data distribution type, at least one prediction function for making predictions using the model component and at least one comparison function for assessing the performance of the model component.

5. A system as claimed in claim 4 wherein the prediction function is one of a library of inference routines available to the model engineering system.

6. A system as claimed in claim 3 wherein the specified model components are passed to the inference engine in the form of the model-fitting management element.

7. A system as claimed in claim 1 wherein the data access engine is arranged to divide the data into training, validation and test datasets according to parameters.

8. A system as claimed in claim 1 comprising a processor arranged to configure the datasets for use by a plurality of computing entities in a computing cluster such that each computing entity is able to carry out at least part of the learning of the inference engine using at least part of the data.

9. A system as claimed in claim 1 which further comprises a visualization system arranged to form a graphical display from received probability distributions learnt by the inference engine as well as performance metrics determined by one or more model performance assessment processes.

10. A computer-implemented method of selecting a model component of a multi-component model of a dynamical system comprising:
    fitting, by a processor, the entire multi-component model using a plurality of empirical datasets observed from the dynamical system and obtaining, for each parameter of a specified one of the individual model components, a first probability distribution expressing uncertainty in the parameter, each individual model component of the multi-component model being a model comprising one or more functions representing biological or physical processes and their interactions;
    fitting the specified one of the individual model components using a subset of the empirical datasets and obtaining, for each parameter of the specified individual model component, a second probability distribution expressing uncertainty in the parameter; and
    comparing the first and second probability distributions and automatically revising the individual model component to produce a revised model component if the difference between the first and second probability distributions exceeds a threshold value, the revised model component retaining one or more elements of the individual model component.

11. A method as claimed in claim 10 wherein the multi-component model is fitted using more data from the empirical datasets than is present in the subset used to fit the specified one of the model components.

12. A method as claimed in claim 10 which comprises repeating the process for each model component of the multi-component model.

13. A method as claimed in claim 10 wherein fitting the multi-component model and fitting the specified one of the model components comprises using an inference engine arranged to learn parameters of the model components and to learn a probability distribution for each parameter which represents a degree of uncertainty of the parameter.

14. A method as claimed in claim 10 comprising assessing the performance of the fitted multi-component model and the fitted specified one of the model components using empirical data observed from the dynamical system which has not been used in the fitting process.

15. A computer-implemented method of multi-component model engineering comprising:
  accessing, by a processor, a library of model components each comprising a function for describing the behavior of a sub-set of the state variables of a multicomponent dynamical system and having at least one parameter, each component of the multi-component dynamical system being a model comprising one or more functions representing biological or physical processes and their interactions;
  using a data access engine to access empirical data measured from the dynamical system, the data being accessed from a plurality of different datasets;
  accessing an inference engine arranged to learn one or more of the parameters of specified ones of the model components and to learn a probability distribution for each parameter which represents a degree of uncertainty of the parameter;
  linking a plurality of user specified model components from the library of model components to form a multi-component model and associating each model component with parameters to be learnt, with data from at least one of the datasets;
  passing the user specified model components to the inference engine in a format suitable for use by the inference engine to learn the parameters and probability distributions of the user specified model components using the data associated with the user specified model components; and
  obtaining a first learnt probability distribution based on a model fitting process for each of the model component of the entire multicomponent model and a second learnt probability distribution based on a model fitting process of an individual model component, and automatically revising the individual model component to produce a revised model component if the difference between the first and second learnt probability distributions exceeds a threshold value, the revised model component retaining one or more elements of the individual model component.

16. A method as claimed in claim 15 comprising receiving an inference engine element for each user specified model component, the inference engine element being arranged to make an instantiation of the model component, read in parameters to be inferred and to make a prediction using the instantiation of the model component.

17. A method as claimed in claim 15 comprising forming a model-fitting management element which links the plurality of user specified model components to form the multi-component model.

18. A method as claimed in claim 15 where the model-fitting management element comprises, for each user specified model component, a name, a data distribution type, at least one prediction function for making predictions using the model component and at least one comparison function for assessing the performance of the model component.

19. A system as claimed in claim 4 wherein assessing the performance of the model component is done using empirical data observed from the dynamical system which has not been used in the fitting process.

20. A method as claimed in claim 15 comprising generating a graphical display from received probability distributions learnt by the inference engine as well as performance metrics determined by one or more model performance assessment processes.

* * * * *